Figure 1:
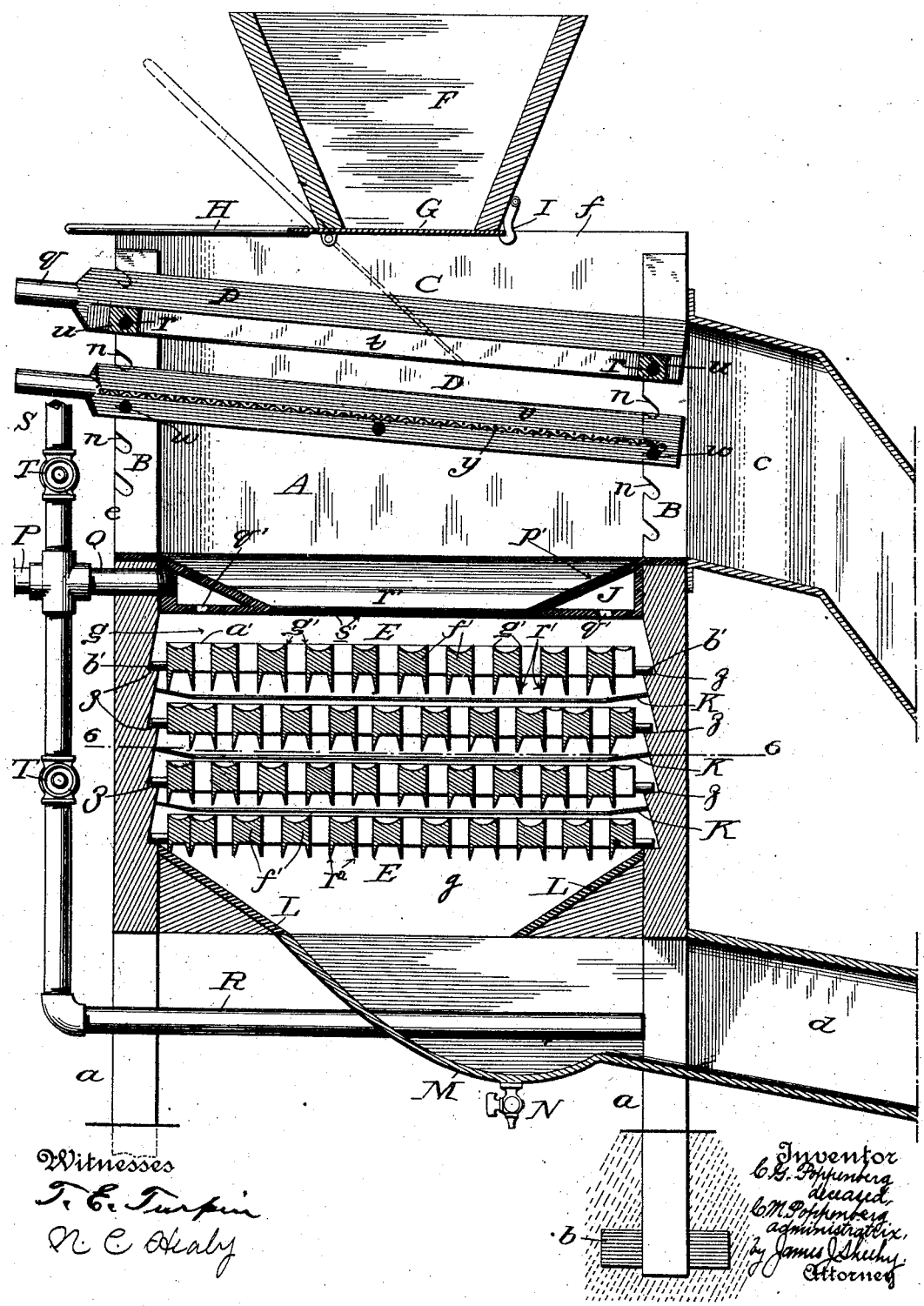

No. 768,624. PATENTED AUG. 30, 1904.
C. G. POPPENBERG, DEC'D.
C. M. POPPENBERG, ADMINISTRATRIX.
APPARATUS FOR RECOVERING VALUES FROM SAND OR DIRT.
APPLICATION FILED APR. 2, 1904.
NO MODEL. 3 SHEETS—SHEET 1.

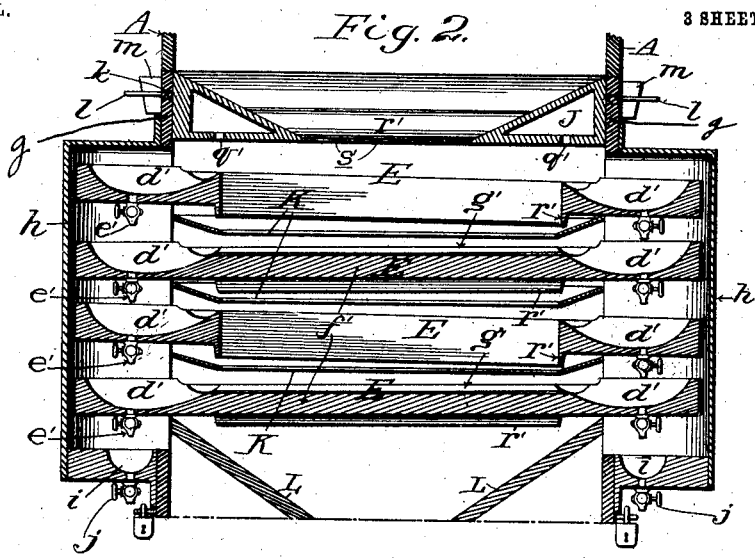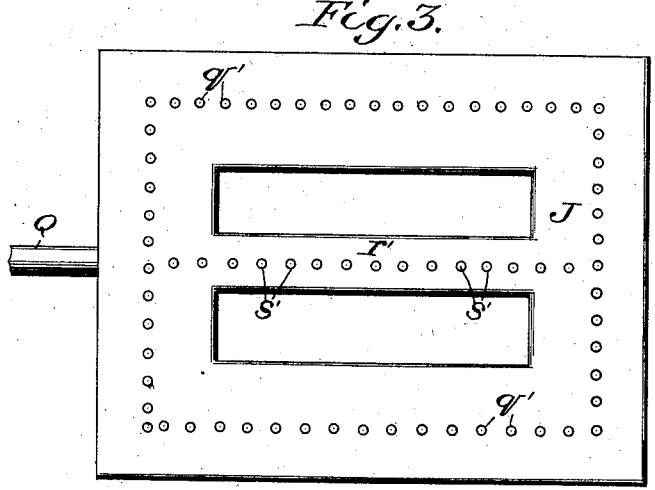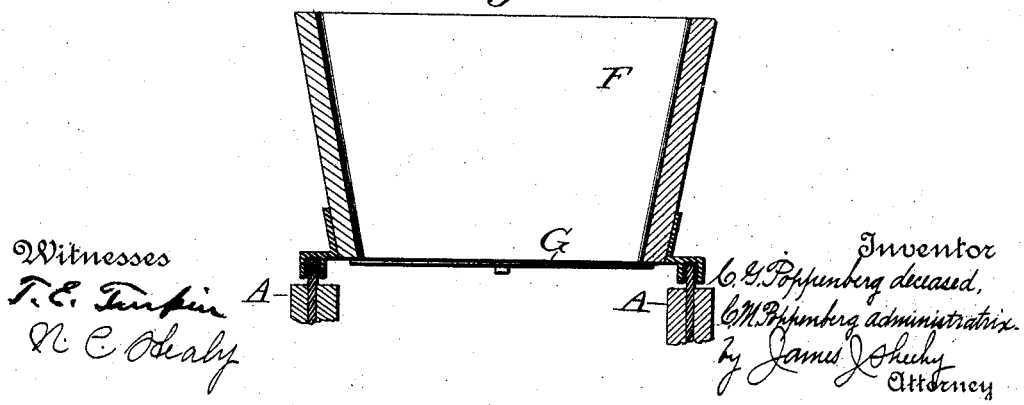

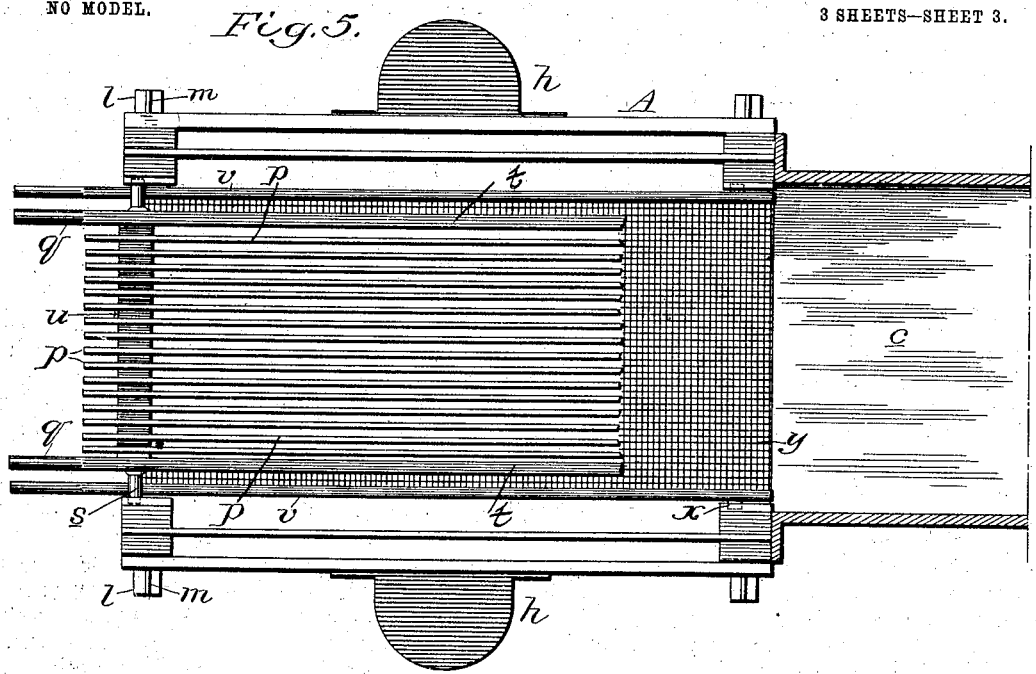
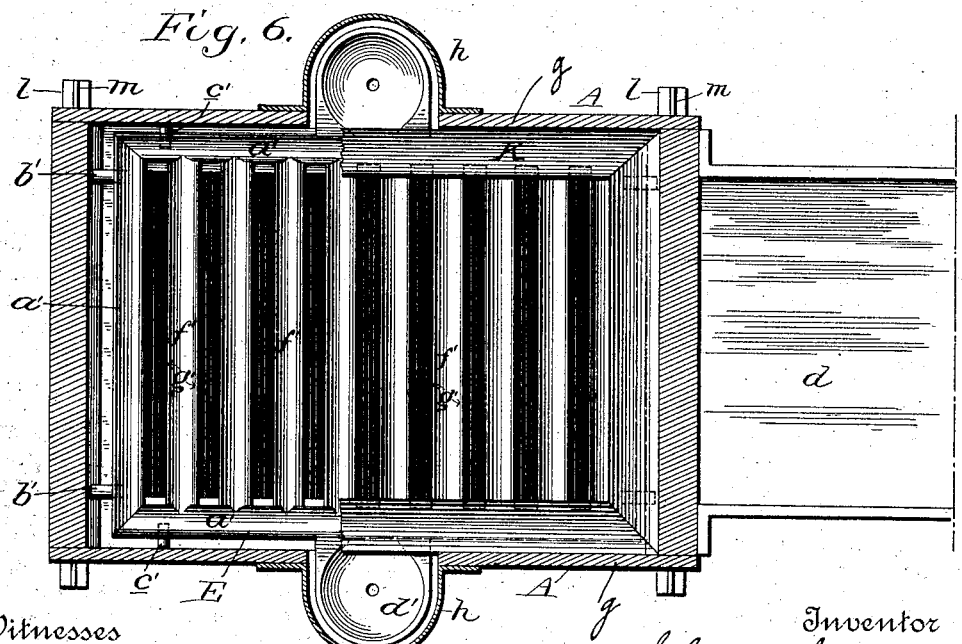

No. 768,624. Patented August 30, 1904.

UNITED STATES PATENT OFFICE.

CHARLOTTE M. POPPENBERG, OF BRAINERD, MINNESOTA, ADMINISTRATRIX OF CORNELIUS G. POPPENBERG, DECEASED.

APPARATUS FOR RECOVERING VALUES FROM SAND OR DIRT.

SPECIFICATION forming part of Letters Patent No 768,624, dated August 30, 1904.

Application filed April 2, 1904. Serial No. 201,344. (No model.)

*To all whom it may concern:*

Be it known that CORNELIUS G. POPPENBERG, deceased, late a citizen of the United States, and a resident of Brainerd, in the county of Crow Wing and State of Minnesota, during his lifetime invented certain new and useful Improvements in Apparatus for Recovering Values from Sand or Dirt, and that I, CHARLOTTE M. POPPENBERG, residing at Brainerd, Minnesota, administratrix of the estate of the said CORNELIUS G. POPPENBERG, do hereby declare, to the best of my knowledge and belief, that the following specification, taken in connection with the drawings forming part of the same, is a clear, true, and complete description of said improvements.

The invention pertains to apparatus for recovering gold from sand, dirt, and gravel, and it contemplates the provision of an apparatus which is possessed of high capacity when used for handling either wet or dry sand, dirt, or gravel and one which is so constructed that it may be quickly and easily supplied with quicksilver and as quickly and easily cleaned up—*i. e.*, cleared of quicksilver and the gold amalgamated therewith.

The invention will be fully understood from the following description and claims, when taken in connection with the accompanying drawings, forming part of this specification, in which—

Figure 1 is a vertical longitudinal central section of the apparatus constituting the preferred embodiment of the invention. Fig. 2 is a detail section taken at right angles to Fig. 1 and illustrating the disposition of the vertical series of quicksilver-holders and the air-chamber above the same. Fig. 3 is an inverted plan view of the air-chamber, illustrating the apertures in the bottom thereof. Fig. 4 is a detail section taken at right angles to Fig. 1 and illustrating the arrangement of the hopper comprised in the apparatus on the side walls of the casing. Fig. 5 is a top plan view of the apparatus with the hopper removed and a portion of the grate broken away, and Fig. 6 is a horizontal section taken on the line 6 6 of Fig. 1 and partly broken away.

Similar letters designate corresponding parts in all of the views of the drawings, referring to which—

A is the casing of the novel apparatus, which is preferably constructed of wood and iron, and is provided at the lower ends of its corner-posts $a$ with anchors $b$, Fig. 1, designed to be sunk in the ground to fix the apparatus in position. At one end the said casing is provided with upper and lower discharge-spouts $c$ $d$, and the upper portion of its opposite end is left open, as indicated by $e$, for a purpose presently pointed out. The side walls of the casing comprise upper permanently-fixed portions $f$ and lower removable panels $g$. The said panels $g$, which are best shown in Figs. 2 and 6, are provided with hollow projections $h$, provided at their lower ends with receptacles $i$, having drain-cocks $j$. Said panels are provided in their ends with horizontal notches $k$, designed to receive hasps $l$ on the corner-posts of the casing. These hasps have apertures to receive taper keys $m$, through the medium of which the panels $g$ may be tightly forced against the corner-posts of the casing. When desired, each of the taper keys may be provided in its lower portion with an aperture to receive a lock, as shown in Fig. 2, this in order to prevent an unauthorized person from removing the panels, and thereby gaining access to the quicksilver-holders and the values therein.

B B are uprights, preferably of metal, fixed in the upper portion of the casing A. These uprights are provided with inclined notches $n$ and are designed to support a grate C, and a screen D, disposed below the grate after the manner best shown in Fig. 1. The grate C preferably comprises side bars $p$, which terminate at their rear ends in handles $q$, cross-rods $r$, which terminate at their ends in projections $s$, designed to be seated in notches of the uprights B, and bars $t$, which are of a less height than the side bars $p$ in about the proportion shown in Fig. 1 and are held a suitable distance apart on the rods $r$ through the medium of spacing-blocks $u$. (Best shown in Figs. 1 and 5.) The said grate C may be fixed at various angles of inclination in the uprights B, so as to regulate the flow or passage of the material fed to the apparatus, and it is designed to permit sand and other fine particles, together with water, to pass to the screen D, while causing rocks and other large particles to pass to the upper spout $c$ and out of the apparatus. In this connection it may be said that the spouts $c$ $d$ may lead independently to one or more points of discharge or may be connected with a launder, as desired, without departure from the scope of the invention.

The screen D preferably comprises side bars $v$, which terminate at their rear ends in handles, cross-rods $w$, which terminate at their ends in projections $x$, Fig. 5, designed to be seated in notches of the uprights B, and a screen $y$, which may be of any desired mesh, arranged between the side bars and above the cross-rods and connected to the same. Said screen D has for its purpose to permit sand and other fine particles, together with water, to pass through it to the amalgamating means hereinafter described and at the same time conduct such large particles as it receives from the grate C to the discharge-spout $c$.

As best shown in Fig. 1, the front and rear walls of the casing A are provided with steps $z$, which have for their purpose to support quicksilver-holders E. The said holders E may have depressions of any suitable form in their upper sides for the reception of quicksilver without involving a departure from the scope of the invention. It is preferred, however, to have each of the holders comprise a rectangular frame $a'$, Fig. 6, having shallow channels in its upper side and also having lugs $b'$ on its ends and lugs $c'$ on its sides, and basins $d'$ on the sides of the frame and in communication with the channel thereof, said basins having drain-cocks $e'$ and cross-bars $f'$ interposed between the side bars of the frame and having channels in communication with that of the frame. It is also preferred to have the channels or pockets of each holder of concave form in cross-section and to provide the same with walls which terminate in sharp edges $g'$, Fig. 1. It is preferred to have the pockets or channels of concave form, since when quicksilver is placed therein it will assume a rounded shape, and consequently sand and other dirt will pass freely over the quicksilver, while the values in the sand will amalgamate with the quicksilver. The sharp edges on the walls of the pockets or channels are preferable, because they present no support on which sand or dirt can collect and clog up the apparatus. When the quicksilver-holders are placed in the casing, as best shown in Figs. 1 and 6, it will be observed that the lugs $b'$ of the holders will bear on the ledges $z$ of the casing and the lugs $c'$ will bear against the inner sides of the casing-panels $g$, this being advantageous, since the outer sides of the holders are held away from the casing, and hence sand or other dirt and water may freely pass down through the spaces between the holders and the casing. As shown in Fig. 2, the holders E are alternately pitched transversely of the apparatus in opposite directions, this in order that when it is desired to recover the values each of the holders may be expeditiously drained into the next lower holder and the lowermost holder may be drained into the basins $i$ at the lower ends of the hollow projections $h$ on the panels $g$.

F, Figs. 1 and 4, is a hopper arranged on the side walls of the casing A and adapted to be adjusted on said side walls or fixed thereto, as desired. Said hopper is open at its bottom and is provided at that point with a hinged valve G, having a handle H and designed to be secured in its closed position through the medium of a pivoted catch I, as shown by full lines in Fig. 1. The said valve G is heavier than its handle, and from this it follows that when the catch I is disengaged from the valve the latter will assume the position shown by dotted lines in said figure, so as to permit the sand or dirt and the water received in the hopper to pass to the grate C.

J, Figs. 1 and 3, is an air-chamber fixed in the casing above the plurality of quicksilver-holders. This chamber has a central opening for the downward passage of dirt and water, and it also has its upper side inclined, as indicated by $p'$, so as to deflect the dirt or sand and water to the center of the quicksilver-holders, and is further provided with minute apertures $q'$ in its under side and a hollow portion $r'$, which extends across the said central opening and is provided in its under side with minute apertures $s'$. When air or other fluid under pressure is supplied to the chamber J, the same will obviously pass in the form of jets downwardly against the quicksilver-holders and by so doing will subject the sand or dirt to pressure and will scatter and force the same on the quicksilver and through the apparatus.

For the purpose of assuring the sand or dirt and the values therein passing over each of the cross-bars of each holder E incident to the downward passage of such sand or dirt the cross-bars of the holders are arranged relatively, as shown in Fig. 1—that is to say, the cross-bar of each holder is disposed in vertical alinement with the spaces between the cross-bars of the holder or holders next to it. From this it follows that when sand passes off of the cross-bars of one holder E it will drop into the pocket or channel in a cross-bar of the holder next below. For the purpose of facilitating and guiding the sand in the course described each of the cross-bars is provided with depending flanges $r^2$, as shown in Fig. 1. When desired, the said flanges may obviously be omitted from the lowermost holder E without affecting the efficiency of the apparatus.

K K are rectangular deflectors fixed in the casing below the upper holders E and having for their purpose to guide the sand or dirt and water which passes over the sides of each holder to the next holder below; L, a rectangular deflector arranged below and adapted to receive from the lowermost holder E; M, a basin arranged to receive from the deflector L and discharge into the lower spout $d$ and having a drain-cock N, and P a pipe adapted to be connected with a source of fluid-pressure supply and having a branch Q, leading into the chamber J, a branch R, leading to the mouth of the spout $d$, and a branch S, and also having regulating-valves T. The branch Q is obviously for the purpose of supplying fluid under pressure to the chamber J, from whence the same passes to serve the function before described. The fluid under pressure conducted to the mouth of the spout $d$ serves to accelerate passage of dirt, &c., from the apparatus through the spout $d$, while the branch S is designed for the connection of a hose, (not shown,) which may be used to advantage in cleaning the apparatus.

The sand or dirt from which values are to be recovered may be fed to the hopper F of the apparatus by any suitable means without involving departure from the scope of the invention. From the said hopper the sand or dirt, together with the water, pass to the grate C, where the finer particles and the water are separated from large rocks and the like, and the latter are conducted out of the apparatus through the spout $c$. The fine particles and the water pass through the screen D and the opening in the chamber J, and when they reach the quicksilver-holders E are subjected to a blast or blasts of air from the chamber in the manner and for the purpose before described. The values in the sand or dirt will amalgamate with the quicksilver in the holders E, while the sand and the water will pass through the series of quicksilver-holders into the basin M and from thence through the spout $d$ out of the apparatus. Any quicksilver which may be spilt from the holders E will be caught in the basin M and may be readily drawn therefrom through the cock N.

When it is desired to recover the collected values from the apparatus, the same may be readily accomplished by removing one of the panels $g$ of the casing A, withdrawing the holders E one by one from the casing, and brushing the quicksilver and the values amalgamated therewith from the holders into a pan or other receptacle through the medium of a brush or the like. While the holders are removed from the casing they may be readily replenished with quicksilver and may then be as readily replaced in the casing for a subsequent operation of the apparatus. It is also to be understood that particularly when the holders E of the construction shown are employed the quicksilver and the values amalgamated therewith may be readily withdrawn by opening the several drain-cocks $h$ of the holders and the drain-cocks $j$ of the basins $i$, so as to permit the quicksilver and values to pass from the latter into suitable receptacles.

In practice the pockets or channels of the quicksilver-holders, which may be of the shape shown or any other suitable shape in cross-section, are preferably lined with tin, so that the quicksilver will tend to stick to the same.

When the novel apparatus is used to handle dry sand or dirt without the assistance of air or water, the basin M is removed, so as to permit the sand to drop from the apparatus to the ground. Also when the apparatus is so used the best results are attained by employing quicksilver pockets or channels closer together than those illustrated, this because the surface quicksilver will be round on top, so that when the sand drops thereon it will quickly roll off, while the values in the sand will amalgamate with the quicksilver.

A detailed description of the construction and relative arrangement of the parts embraced in the present and preferred embodiment of the invention has been entered into in order to impart a full, clear, and exact understanding of the same. It is not, desired, however, to confine the invention to such specific construction and relative arrangement of parts, as such changes or modifications may be made in practice as fairly fall within the scope of the invention as claimed.

Having described the invention, what is claimed, and desired to be secured by Letters Patent, is—

1. In an apparatus for recovering values from sand and dirt, the combination of a casing, a plurality of quicksilver-holders arranged one above the other, and having depressions provided with sharp edges, and spaces between said depressions for the downward passage of sand or dirt, means for supporting the holders in the casing in such manner that spaces are formed between the sides of the holders and the casing for the downward passage of sand or dirt, and deflectors arranged below the upper holders so as to receive sand or dirt from the said spaces and conduct the same to the next lower holder.

2. In an apparatus for recovering values from sand and dirt, the combination of a casing, a plurality of quicksilver-holders arranged one above the other in the casing, and having connected channels provided with sharp edges and spaces between said channels, and also having depending flanges at the sides of the spaces, means for supporting the holders in the casing so as to afford spaces between the holders and the casing, and deflectors arranged below the holders so as to receive from the spaces between the holders and the casing.

3. In an apparatus for recovering values from sand and dirt, a plurality of quicksilver-holders arranged one above the other, and respectively comprising a frame having a channel in its upper side provided with knife-edges, cross-bars connecting opposite bars of the frame and having channels in communication with those of said opposite bars and provided with knife-edges, basins carried by bars of the frame, communicating with the channels of said bars, and having drain-openings, and means controlling the said openings.

4. In an apparatus for recovering values from sand or dirt, the combination of a casing having ledges on opposite walls, and one or more quicksilver-holders having lugs on opposite sides thereof bearing on the ledges of the opposite casing-walls, and also having lugs on their other sides bearing against the other walls of the casing, whereby spaces are formed between the sides of the holder or holders and the walls of the casing.

5. In an apparatus for recovering values from sand or dirt, the combination of a casing having a discharge-spout $d$, one or more quicksilver-holders arranged in the casing, a chamber arranged above said holder or holders, and provided in its under side with a plurality of discharge-apertures, and a conduit connected with said spout and said chamber, and adapted to be connected with a source of fluid-pressure supply.

6. In an apparatus for recovering values from sand or dirt, the combination of a casing having upper and lower discharge-spouts, a basin communicating with the lower discharge-spout, and having a drain-cock, one or more quicksilver-holders arranged in the casing above the basin, a chamber arranged in the casing above the holder or holders; said chamber being provided in its under side with a plurality of minute discharge-apertures, and being also provided with a central opening and an inclined wall extending to the same, a conduit for conducting fluid under pressure to the chamber, a screen disposed above the chamber, and inclined so as to discharge large particles into the upper discharge-spout, a grate disposed above the screen and inclined so as to discharge rocks and other very large particles into the upper discharge-spout, and a hopper arranged on the casing, above the grate, and having a hinged valve, and a catch for holding the same in a closed position.

7. In an apparatus for recovering values from sand or dirt, the combination of a casing having removable panels provided with projections, closed at their upper ends and having drain-cocks at their lower ends, and removable quicksilver-holders arranged in the casing one above the other and having depressions in their upper sides, and also having basins communicating with said depressions, disposed in the hollow projections of the panels, and provided with drain-cocks.

8. In an apparatus for recovering values from sand or dirt, the combination of a casing having a discharge-spout at one end, a pair of uprights arranged in the casing adjacent to the discharge-spout, and having inclined notches at intervals of their height, a pair of uprights arranged in the casing remote from the discharge-spout, and having inclined notches at intervals of their height, a screen inclined downwardly toward and arranged to discharge at one end into the spout, and having projections disposed in notches of the uprights, and a grate arranged above the screen and inclined downwardly toward and arranged to discharge into the spout, and having projections disposed in notches of the uprights.

In testimony whereof I have hereunto set my hand in presence of two subscribing witnesses.

CHARLOTTE M. POPPENBERG,
*Administratrix of the estate of Cornelius G. Poppenberg, deceased.*

Witnesses:
W. A. FLEMING,
J. T. SANBORN.